Sept. 10, 1968 J. WILSON 3,400,621
COIN OPERATED VENDING MACHINE
Filed Oct. 5, 1966 2 Sheets-Sheet 1
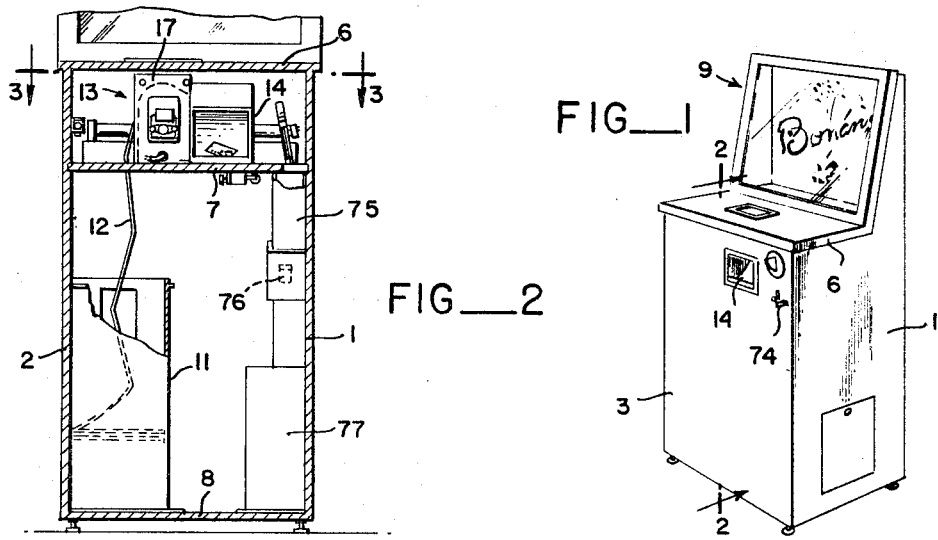
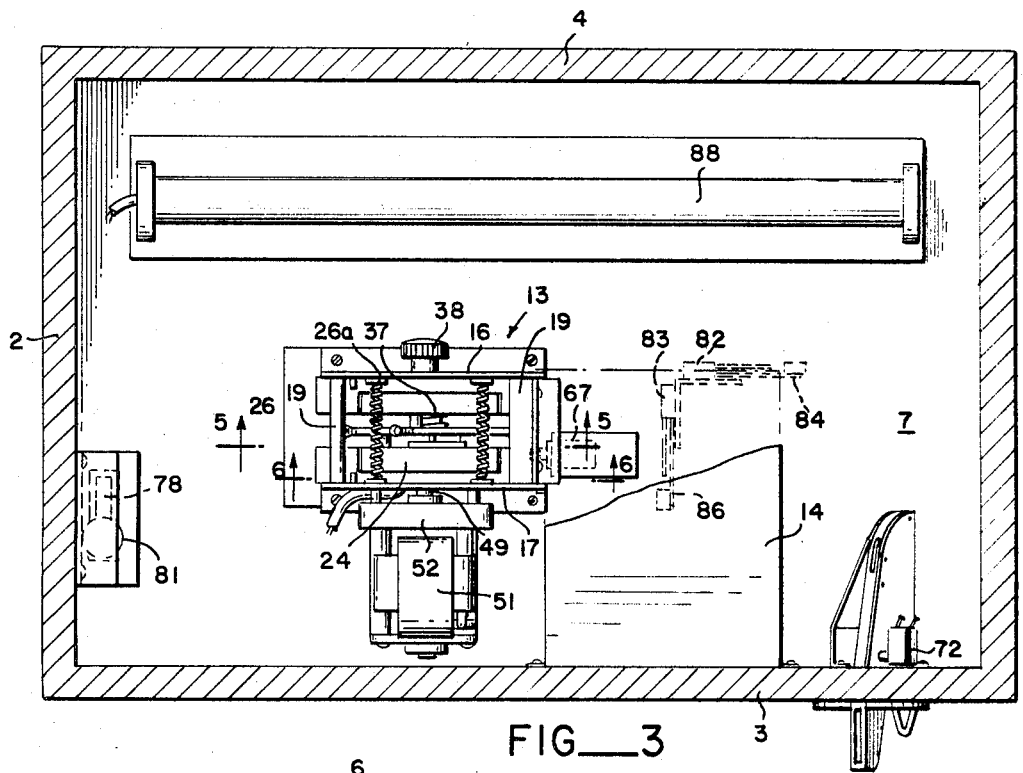
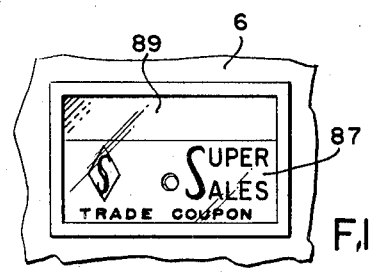
JOHNNIE WILSON
INVENTOR.
BY
ATTORNEYS Sept. 10, 1968  J. WILSON  3,400,621
COIN OPERATED VENDING MACHINE
Filed Oct. 5, 1966  2 Sheets-Sheet 2
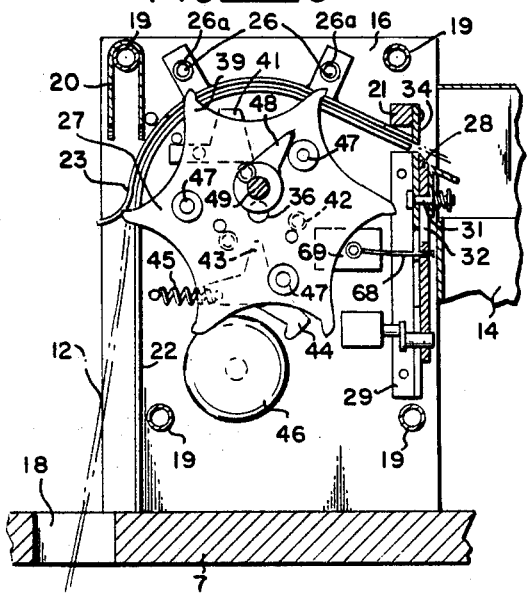
FIG__5
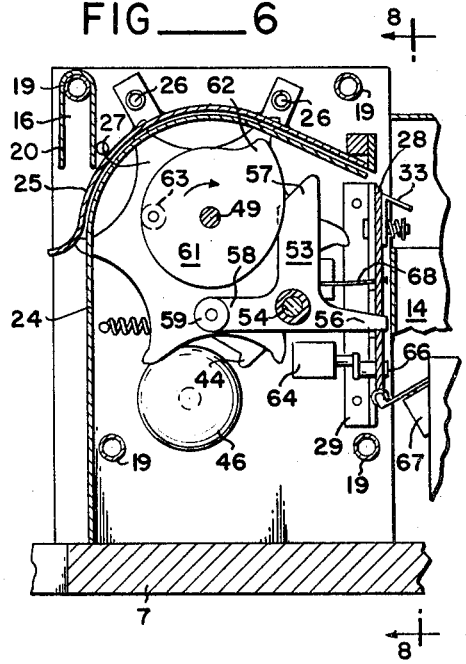
FIG__6
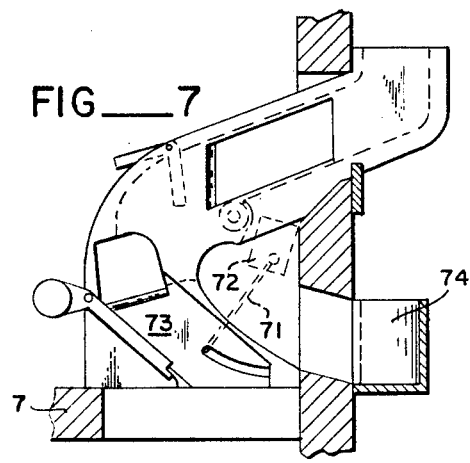
FIG__7
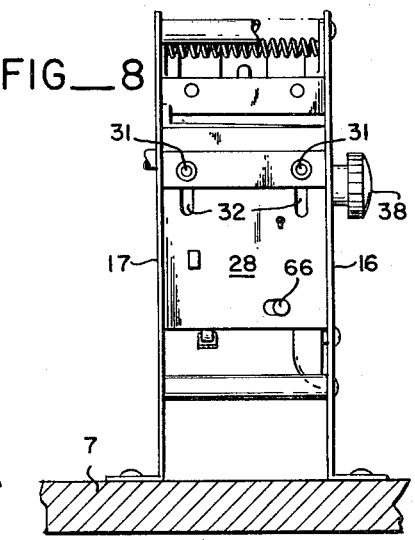
FIG__8
FIG__9
JOHNNIE WILSON
INVENTOR.
BY 
ATTORNEYS – # United States Patent Office 3,400,621
Patented Sept. 10, 1968

3,400,621
COIN OPERATED VENDING MACHINE
Johnnie Wilson, 215 N. 7th St., Miles City, Mont. 59301
Filed Oct. 5, 1966, Ser. No. 584,511
4 Claims. (Cl. 83—205)

ABSTRACT OF THE DISCLOSURE

A coin operated vending machine for dispensing tickets or coupons in continuous strip form which includes a feeding mechanism and a cutter device operable upon the insertion of a coin into the machine. The coupons or tickets in the strip are arranged serially with the adjacent tickets being of dissimilar values. The construction of the device allows only the terminal coupon on the strip next to be dispensed to be viewed by the user.

---

The present invention relates in general to vending machines and more particularly to a coin-operated vending machine adapted to dispense a trade coupon, ticket or the like upon the insertion of a coin into the machine.

The present vending machine may be used primarily for sales promotion and advertising and is so constructed as to move individual coupons one at a time into position for viewing by the user and to dispense the viewed coupon when a coin is deposited while simultaneously moving the next succeeding coupon into view. The only coupon in view is the one which will be dispensed upon the insertion of a coin. The plurality of coupons are in continuous strip or tape form and constitute trade coupons of varying value toward the purchase of goods from a designated merchant. The customer is thus induced to continue playing the machine in hopes of obtaining a coupon of greater value than the one in view. The machine provides a reward to the player in the way of amusement and the chance of obtaining a coupon of great value while at the same time promoting the trade of the merchant named on the coupon.

Accordingly, the primary object of the present invention is to provide a coupon vending machine wherein only a single coupon is in view at all times and will be dispensed upon the insertion of a coin while simultaneously moving the next succeeding coupon into view.

Another object is to provide a device of the character described wherein one using the vending machine and viewing the trade coupon will be induced to continue inserting coins with the knowledge that successive coupons are of different value.

Another object of the present invention is to provide a coupon vending machine of the character described which provides a means for advertising by merchants to promote trade while at the same time rewarding the person using the machine.

Another object of the invention is to provide a device of the character described for the patrons of amusement and recreation areas and the like wherein coupons of value toward purchase of goods are dispensed with benefit to both the advertising merchant and the individual playing the machine in the way of reward and amusement.

Other objects and advantages will appear and be understood from the following description and claims, the invention consisting of the novel construction and in adaptation and combination of parts hereinafter described and claimed.

In the accompanying drawings:

FIG. 1 is a perspective view of the vending machine;

FIG. 2 is a cross sectional view taken along the lines 2—2 of FIG. 1;

FIG. 3 is a cross sectional view taken along lines 3—3 of FIG. 2;

FIG. 4 is a detail plan view of the viewing window of the machine;

FIG. 5 is a cross sectional view of the feeding and cutting unit of the machine taken along lines 5—5 of FIG. 3;

FIG. 6 is a cross sectional view of the feeding and cutting units taken along lines 6—6 of FIG. 3;

FIG. 7 is an elevational detail of the coin slot mechanism;

FIG. 8 is an elevational view taken along lines 8—8 of FIG. 6; and

FIG. 9 is an electrical schematic of the control circuit for the machine.

Referring now to the drawings wherein like reference numerals indicate identical parts in the various views, FIG. 1 illustrates the overall machine having a cabinet with side panels 1 and 2 and front and rear panels 3 and 4 respectively. The cabinet structure also includes a horizontal panel 6, a support shelf 7, a bottom panel 8 and a display window section 9. The display window section 9 may be utilized for operating instructions, advertising material and the like. It will be understood, of course, that the details of the cabinet structure and its design may be varied without departing from the spirit and scope of the invention.

Referring to FIG. 2, a bin or container 11 is located in the bottom of the cabinet for containing a quantity of tickets or coupons 12 which are in continuous tape or strip form and may be perforated or scored in a conventional manner so as to fold into the stack within the bin 11 as indicated. As the tickets are dispensed, they are merely drawn upwardly out of the bin and over a feed mechanism indicated generally at 13 and shown in detail in FIGS. 5 and 6. As will be later explained, the feed mechanism also includes a cutter which is actuated upon the insertion of a coin to sever a coupon from the continuous strip after it has been advanced. The coupon is dispensed through a chute or receptacle 14 opening into the front face 3 of the cabinet.

Referring in particular to FIGS. 3, 5 and 6, the feed mechanism 13 comprises the upright plates 16 and 17 mounted upright on the shelf 7. The plates 16 and 17 are located adjacent a hole 18 in the shelf through which the coupon strip is pulled as illustrated most clearly in FIGS. 5 and 6. The plates may be held in spaced relation by means of the spacers 19 and the cutter bar 21. A view restrictor shield 20 is hung from the spacer 19 at the left of the feed mechanism to prevent viewing of oncoming coupons. A first coupon strip guide is provided on the plate 16 by the track 22 and the guide strip 23 spaced therefrom and a second coupon strip guide is provided on the plate 17 by an identical track member 24 and guide strip 25. The tracks 22 and 24 may be rigidly attached to the respective plates 16 and 17 with the guide strips 23 and 25 being mounted on the pins 26 and biased against the respective plates by springs 26a. The coupon strip guides serve to engage the lateral edges of the strip as it is pulled upwardly by means of a feed sprocket 27 which rotates between the guides, the operation of which will be presently explained. At the outfeed end of the strip guides a vertically movable knife blade 28 is mounted for reciprocation on the guide bars 29 by means of the pins 31 which extend through the slots 32 in the blade. A lip or flange 33 is mounted on the pins 31 and is spring pressed against the surface of the reciprocating blade in order to hold the blade against the guides 29 during its movement. The blade 28 cooperates with the anvil 34 to sever a coupon from the strip after it has been indexed therebetween by the feed sprocket 27. The severed coupon then falls through the chute 14 as previously described.

The feed sprocket 27 is carried on the rotatable shaft 36 journaled for rotation in the plate 16 with the shaft being held in its operative position by means of the spring 37 and the knob 38. The sprocket 27 is provided with teeth or prongs 39 for engaging centrally located holes in the coupons to grasp and move the coupon as shown in FIG. 5. As viewed in FIG. 5, the feed sprocket 27 moves in a clockwise direction and a releasable pall 41 may be used to prevent reverse rotation of the spocket. The sprocket may be manually moved by means of the knob 38 in the reverse direction by simply releasing the pall 41 in order to make necessary repairs etc.

If desired, an audible signal may be provided to indicate the advancement of a single coupon. The signal is produced by the three projections 42 on the back side of the sprocket 27 as viewed in FIG. 5 which contact the arm 43 on the pivoted bell hammer 44 which strikes the bell 46 for each one-third revolution of the sprocket and advancement of one coupon. A spring 45 normally holds the hammer away from the bell.

The sprocket 27 is driven by means of the follower rollers 47 on the front face thereof as viewed in FIG. 5 which are contacted by the rotating cam member 48 mounted on the drive shaft 49 which is journaled for rotation in the opposite plate 17. The drive shaft 49 is driven by means of an electric motor 51 through a gear reduction unit 52 in a conventional manner. The cam 48 is so located relative to the followers 47 that one revolution of the shaft 49 causes movement of the sprocket wheel 27 through one-third of a revolution for the advancement of one coupon. The drive shaft is rotated through one revolution each time a coin is deposited to advance and dispense one coupon by means of an electrical control circuit presently to be described. In order to sever the ticket which is advanced between the blade 28 and the anvil 34 by one revolution of the shaft 49 the blade is operated by means of an actuating lever 53 pivotally mounted on the stub shaft 54. The actuator 53 includes a horizontal arm 56 which engages an opening in the blade 28 as illustrated in FIG. 6 and two right angularly disposed follower arms 57 and 58. The arm 58 has a follower roller 59 secured thereto. In order to positively actuate the member 53 through one oscillation for each rotation of the shaft 49, the cam wheel 61 is fixed to the shaft 49 and is provided with a lobe 62 which first contacts the roller 59 to move the blade upwardly and is so positioned as to time the cutting action to occur after the coupon has been completely indexed or advanced. The blade is returned downwardly to its original position shown in FIG. 6 by a cam roller 63 on the cam 61 which contacts the inclined surface on the upper end of the arm 57 to return the blade.

The movement of the blade 28 may be used to operate a counter mechanism 64 if desired through actuator crank pin 66. The movement of the blade also serves to operate a normally closed micro switch 67 for conditioning the electrical circuit to control the motor 51 during the operating cycle of the blade, and a switch arm 68 for operating a normally opened motor carry over micro switch 69. The function of the various switches will be presently explained with reference to FIG. 9.

The feeding and dispensing mechanism is actuated by means of depositing a coin in a conventional coin drop illustrated in FIG. 7. The exact details of the coin drop and rejection unit form no part of the present invention and any such known mechanism may be used which will serve to actuate the switch arm 71 for the micro switch 72 upon the passage of a coin through the chute 73. The device is also provided with a coin return slot 74 for the rejection of unsuitable coins in a conventional manner. The coin, assuming that it is of the right denomination and passes through the coin slot mechanism, passes downwardly through the tube or passage 75 and actuates a second switch 76 which may be merely a micro switch with a contact arm contacted and operated by the passage of the coin. The coin continues downwardly to a coin box 77 conveniently located on the bottom panel 8 of the cabinet. The manner in which the two switches 72 and 76 cooperate to control the operation of the device will be explained in connection with the electrical schematic of FIG. 9.

Included in the control circuit for the device is a ball actuated tilt switch or its equivalent with the tilt switch illustrated including a switch arm 78 which normally holds the contacts of the switch 79 closed with the contacts being caused to open by the ball 81 contacting switch arm upon tilting of the cabinet. Opening of the switch 79 breaks the motor circuit and deenergizes the device. Second and third inertia tilt switches 82 and 83 are also provided and may be of conventional design. These switches are normally closed switches opened by jarring of the cabinet either forwardly or sideways which causes the weighted switch actuator arms 84 and 86 to open the contacts.

As shown in FIG. 4, the coupon which has been moved upwardly by the feed mechanism is ready for dispensing over the blade 28 and may be viewed through the window 87. Light source 88 is mounted on the shelf 7 so as to illuminate the coupon in the viewing position with a reflective surface 89 being provided on the viewing window to reflect the light downwardly onto the coupon to aid in its illumination.

Referring now to FIG. 9, operation of the device will be described through one complete cycle. As aforementioned, the three tilt switches 79, 82 and 83 are normally closed switches and will remain closed unless the cabinet is unduly jarred or tilted.

It is to be noted that when the user approaches the device, he may view the coupon which will first be dispensed from the device upon the insertion of the proper coin. He will not know, of course, the value of the succeeding coupon and cannot view the next coupon until he purchases the coupon or ticket which is in sight. All of the switches in the circuit will be in the condition illustrated in FIG. 9 at the beginning of the cycle. Upon insertion of the proper coin, the switch 72, which comprises a double pole switch having one normally closed contact and one normally open contact as illustrated in FIG. 9, is actuated. Upon closing of the normally open contact of the switch 72, the motor relay 91 is energized to close the normally open contacts 91A and 91B. Closing the contact 91A completes a holding circuit through the normally closed motor-off-micro switch 67. The motor 51 has not yet been energized, however, and will not be energized until the coin contacts the second switch 76 so as to energize the relay 92 which is then locked in through its contacts 92A as long as the switch 67 is closed. The second coin switch 76 thus provides means to prevent continuous operation of the device should the switch 72 be jammed or blocked. The contacts 92B of the relay are also closed to complete a circuit through the motor 51 via the contact of the switch 72 which has returned to the normally closed position after the passage of the coin. The motor is then energized and will serve to advance a new coupon into position and to raise the knife blade 28 previously explained. As the knife blade begins its upward travel, the switch arm of the switch 67 is released allowing the normally closed switch to open thus dropping out the relays 91 and 92. The normally open switch 69, however, is caused to close through actuation of its arm 68 as the blade moves upwardly so as to hold in the motor until the blade again descends and again closes the switch 67. When the blade returns downwardly, the motor is thus deenergized by opening of switch 69 and the cycle is complete and ready to be repeated.

From the foregoing, it will be apparent to those skilled in the art that the vending machine according to the present invention provides new and novel results in structure and mode of operation. The system provides a novel and effective means for dispensing trade coupons or the like one at a time with the purchased coupon being visible while succeeding coupons are maintained out of sight. The results obtained make possible a merchandizing and advertising plan which is effective and beneficial to both merchant and customer. The arrangement and types of structural component utilized within the invention may be subjected to numerous modifications well within the purview of this invention and applicant intends only to be limited to a liberal interpretation of the specification and appended claims.

Having thus described the invention, what is claimed as new, and desired to be secured by Letters Patent is:

1. A vending machine for dispensing individual trade coupons and the like appearing in sequence in elongated strip form with said coupons being of varying values comprising; storage means containing a quantity of said strip, feed mechanism operatively associated with said strip, said feed mechanism including means to index said strip in increments equal in length to one coupon length during one indexing cycle, guide means carried on said feed mechanism over which the strip is advanced, said guide means including laterally spaced guide sections contacting the lateral sides of the strip to move the strip over a generally horizontal course for viewing each coupon being indexed first to a viewing station so as to be visible to a user of the device and then being indexed to a dispensing station during the succeeding indexing cycle, cutter means associated with said feed mechanism for severing the terminal coupon from said strip at the end of each indexing cycle, motor means for driving said feed mechanism, and coin actuated control means for actuating said motor to move the feed mechanism through one complete indexing cycle upon the deposit of a coin of predetermined denomination, and view restricting means permitting a view only of the coupon next to be dispensed, whereby the operator may view only the coupon he is purchasing, the remaining portion of the strip being located so as to be out of the view of the operator.

2. The combination according to claim 1 wherein; said feed mechanism includes a feed sprocket having circumferentially spaced prongs thereon for engaging said strip, and means for mounting said sprocket for rotation between said guide sections to advance the strip.

3. The combination according to claim 2 including; a drive shaft drivingly connected to said motor means, cam means on said shaft, a plurality of cam followers on said sprocket, said cam followers being so disposed as to be contacted by said cam means for indexing said strip the predetermined increment once for each rotation of the drive shaft.

4. The device according to claim 3 wherein said cutter means includes a vertically reciprocable cutter blade, an actuating lever including an operating arm in contact with the blade and first and second follower arms, second cam means on said drive shaft, said second cam means having first and second contact members for sequentially contacting said first and second follower arms during each revolution of the shaft after movement of the sprocket, whereby the blade is reciprocated to sever the terminal coupon advanced thereover at the end of each indexing cycle.

References Cited
UNITED STATES PATENTS

| | | | |
|---|---|---|---|
| 1,114,818 | 10/1914 | Sweet | 83—205 X |
| 2,272,440 | 2/1942 | Streckfuss | 83—203 |
| 2,915,965 | 12/1959 | Persak | 83—205 X |
| 3,153,361 | 10/1964 | Allen | 83—203 |
| 893,493 | 7/1908 | Harris. | |
| 893,582 | 7/1908 | Hess. | |
| 976,517 | 11/1910 | Stambaugh. | |
| 930,667 | 8/1909 | Hess. | |
| 2,742,338 | 4/1956 | Abbott. | |
| 1,332,386 | 3/1920 | Dwyer. | |

JAMES M. MEISTER, *Primary Examiner.*